(12) United States Patent
Phillips

(10) Patent No.: US 8,454,472 B2
(45) Date of Patent: Jun. 4, 2013

(54) MULTI-SPEED TRANSMISSION WITH EXTERNAL DRIVE GEARSETS

(75) Inventor: Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 276 days.

(21) Appl. No.: 12/901,912

(22) Filed: Oct. 11, 2010

(65) Prior Publication Data

US 2012/0088626 A1   Apr. 12, 2012

(51) Int. Cl.
*F16H 57/10* (2006.01)
*F16H 3/62* (2006.01)
*F16H 3/44* (2006.01)

(52) U.S. Cl.
USPC ............ 475/275; 475/271; 475/284; 475/302

(58) Field of Classification Search
USPC .......................................... 475/271, 302, 323
See application file for complete search history.

(56) References Cited

U.S. PATENT DOCUMENTS

| | | | | |
|---|---|---|---|---|
| 4,531,428 | A * | 7/1985 | Windish | 475/279 |
| 6,960,149 | B2 * | 11/2005 | Ziemer | 475/276 |
| 2009/0221394 | A1 * | 9/2009 | Phillips et al. | 475/213 |
| 2012/0094799 | A1 * | 4/2012 | Phillips | 475/275 |

* cited by examiner

*Primary Examiner* — David D Le
*Assistant Examiner* — Colby M Hansen

(57) ABSTRACT

A transmission is provided having an input member, an output member, three planetary gear sets, two external gear sets, a plurality of coupling members and a plurality of torque transmitting devices. Each of the planetary gear sets includes first, second and third members. Each of the external gear sets includes first and second gears. The torque transmitting devices include clutches and brakes.

20 Claims, 2 Drawing Sheets

| GEAR STATE | GEAR RATIO | RATIO STEP | TORQUE TRANSMITTING MECHANISMS | | | | | |
|---|---|---|---|---|---|---|---|---|
| | | | 34 | 36 | 28 | 26 | 30 | 32 |
| Rev | -3.899 | | | X | | X | | X |
| N | | -0.85 | | | | | | |
| 1st | 4.592 | | | X | X | | | X |
| 2nd | 3.074 | 1.49 | | X | X | X | | |
| 3rd | 2.163 | 1.42 | | | X | X | | X |
| 4th | 1.550 | 1.40 | | | X | | X | X |
| 5th | 1.237 | 1.25 | | | X | X | X | |
| 6th | 1.000 | 1.24 | | | | X | X | X |
| 7th | 0.841 | 1.19 | | X | | X | X | |
| 8th | 0.753 | 1.12 | X | | | X | X | |
| 9th | 0.692 | 1.09 | X | X | | | X | |
| 10th | 0.623 | 1.11 | X | | | | X | X |

X = ON - ENGAGED CARRYING TORQUE

FIG. 3

MULTI-SPEED TRANSMISSION WITH EXTERNAL DRIVE GEARSETS

FIELD

The invention relates generally to a multiple speed transmission having a plurality of gear sets and a plurality of torque transmitting devices, and more particularly to a transmission having ten or more speeds produced by a combination of planetary gear sets, external gear sets and torque transmitting devices.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations that exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, three planetary gear sets, two external gear sets, a plurality of coupling members and a plurality of torque transmitting devices. Each of the planetary gear sets includes first, second and third members. Each of the external gear sets include first and second gear members. The torque transmitting devices are for example clutches and brakes.

An embodiment of the transmission includes an input member, an output member, a first, second and third planetary gear set each having a first, second and third member, a first, second and third gear set each having a first gear intermeshed with a second gear.

In another embodiment of the transmission, a first interconnecting member continuously interconnects the second gear of the first co-planar gear set with the third member of the first planetary gear set.

In still another embodiment of the transmission, a first, second and third planetary gear sets each having a sun gear, carrier member and ring gear. The input member is continuously interconnected with the sun gear of the first planetary gear set. The output member is continuously interconnected with the ring gear of the third planetary gear set.

In still another embodiment of the transmission, a first and second torque transfer assembly each having a first gear and a second gear.

In still another embodiment of the transmission, a first interconnecting member continuously interconnecting the first gear of the first co-planar gear set with the carrier member of the first planetary gear set.

In still another embodiment of the transmission, a second interconnecting member continuously interconnecting the ring gear of the first planetary gear set with the carrier member of the second planetary gear set.

In still another embodiment of the transmission, a third interconnecting member continuously interconnecting the ring gear member of the second planetary gear set with the sun gear of the third planetary gear set.

In yet another embodiment of the transmission, fourth interconnecting member continuously interconnecting the carrier member of the third planetary gear set with the first gear of the second co-planar gear set.

In yet another embodiment of the transmission, a first torque transmitting mechanism selectively engageable to interconnect the carrier member of the first planetary gear set with at least one of the ring gear of the second planetary gear set and sun gear of the third planetary gear set.

In yet another embodiment of the transmission, a second torque transmitting mechanism selectively engageable to interconnect the second gear of the first co-planar gear set with the second gear of the second co-planar gear set.

In yet another embodiment of the transmission, a third torque transmitting mechanism selectively engageable to interconnect the sun gear of the first planetary gear set and the input member with at least one of the first gear of the second co-planar gear set and the second carrier of the third planetary gear set.

In yet another embodiment of the transmission, a fourth torque transmitting mechanism selectively engageable to interconnect at least one of the first gear of the second co-planar gear set and the carrier member of the third planetary gear set with the sun gear member of the second planetary gear set.

In yet another embodiment of the transmission, a fifth torque transmitting mechanism selectively engageable to interconnect the ring gear of the first planetary gear set and the carrier member of the second planetary gear set with the stationary member.

In yet another embodiment of the transmission, a sixth torque transmitting mechanism selectively engageable to interconnect the sun gear member of the second planetary gear set with the stationary member.

The torque transmitting mechanisms are each selectively engageable in combinations of at least three to establish at least ten forward speed ratios and at least one reverse speed ratio between the input member and the output member.

Further aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting elements in each of the available forward and reverse speeds or gear ratios of the transmission illustrated in FIGS. 1 and 2.

DETAILED DESCRIPTION

The following description is merely exemplary in nature and is not intended to limit the present disclosure, application, or uses.

Figure 1:
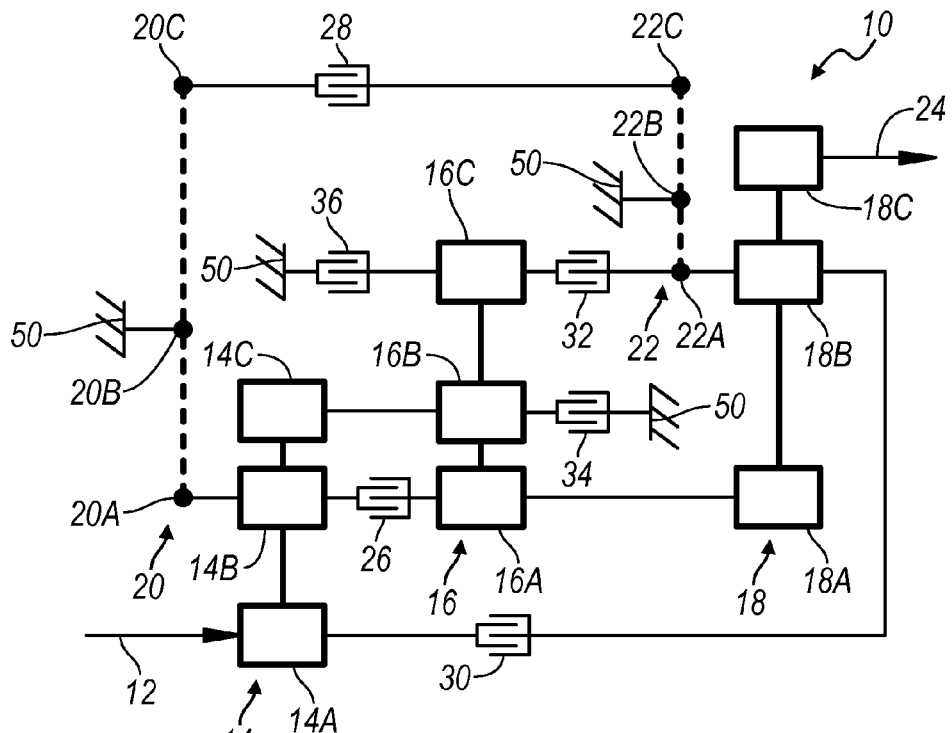
FIG. 1 is a lever diagram of an embodiment of a ten speed transmission according to the present invention.

Referring now to FIG. 1, an embodiment of a ten speed transmission 10 is illustrated in a lever diagram format. A lever diagram is a schematic representation of the components of a mechanical device such as an automatic transmission. Each individual lever represents a gear set. Solid line levers represent a planetary gear set wherein the three basic mechanical components of the planetary gear set are each represented by a node. Therefore, a single planetary gear set lever contains three nodes: one for the sun gear, one for the planet gear carrier, and one for the ring gear. Dashed line levers are spur or external drive gear sets which may be represented in the lever diagram as planetary gear sets having grounded planet carrier members. Accordingly, the outer nodes represent the first and second drive gears and the inner node represents the imaginary grounded planet carrier member. The relative length between the nodes of each lever can be used to represent the ring-to-sun ratio and first drive gear to second drive gear ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. Where the torque transmitting device is a brake, one set of interleaved fingers is coupled to a ground. Further explanation of the format, purpose and use of lever diagrams can be found in SAE Paper 810102, "The Lever Analogy: A New Tool in Transmission Analysis" by Benford and Leising, which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a first external gear set 20 having three nodes: a first node 20A, a second node 20B and a third node 20C, a second external gear set 22 having three nodes: a first node 22A, a second node 22B and a third node 22C and an output shaft or member 24.

The input member 12 is coupled to the first node 14A of the first planetary gear set 14. The output member 24 is coupled to the third node 18C of the third planetary gear set 18. The second node 14B of the first planetary gear set 14 is coupled to the first node 20A of the first external gear set 20. The third node 14C of the first planetary gear set 14 is coupled to the second node 16B of the second planetary gear set 16. The first node 16A of the second planetary gear set 16 is coupled to the first node 18A of the third planetary gear set 18. The second node 18B of the third planetary gear set 18 is coupled to the first node 22A of the second external gear set 22.

A first clutch 26 selectively connects the second node 14B of the first planetary gear set 14 and first node 20A of the first external gear set 20 to the first node 16A of the second planetary gear set 16. A second clutch 28 selectively connects third node 20C of the first external gear set 20 to the third node 22C of the second external gear set 22. A third clutch 30 selectively connects the input member 12 the first node 14A of the first planetary gear set 14 to the second node 18B of the third planetary gear set 18 and to first node 22A of the second external gear set 22. A fourth clutch 32 selectively connects the third node 16C of the second planetary gear set 16 to the first node 22A of the second external gear set 22 and to the second node 18B of the third planetary gear set 18. A first brake 34 selectively connects the second node 16B of the second planetary gear set 16 and the third node 14C of the first planetary gear set 14 to a stationary element or transmission housing 50. A second brake 36 selectively connects the third node 16C of the second planetary gear set 16 to a stationary element or transmission housing 50.

Figure 2:
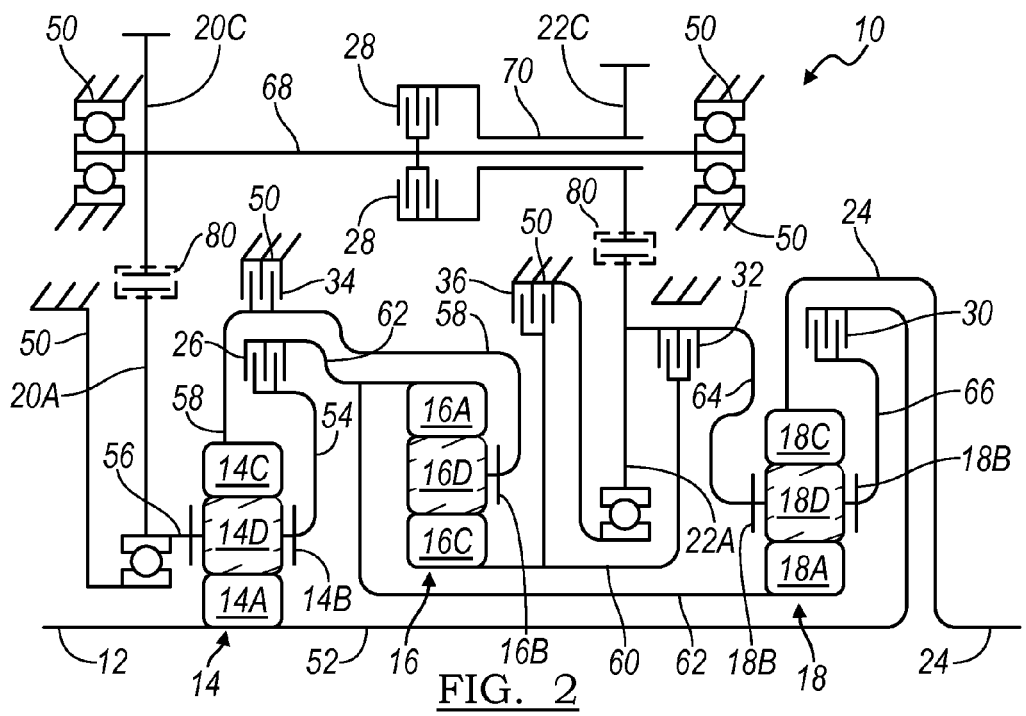
FIG. 2 is a diagrammatic view of an embodiment of a ten speed transmission according to the present invention.

Referring now to FIG. 2, a schematic diagram illustrates an embodiment of the ten speed transmission 10 according to the present invention. In FIG. 2, the numbering from the lever diagram of FIG. 1 is carried over. The clutches, brake and couplings or interconnections are correspondingly presented whereas the nodes of the planetary gear sets now appear as components of planetary gear sets such as sun gears, ring gears, planet gears and planet gear carriers and the nodes of the external drive gear sets now appear as components of the external drive gear sets such as first and second drive or transfer gears.

For example, planetary gear set 14 includes a sun gear member 14A, a planet gear carrier member 14B and a ring gear member 14C. The planet gear carrier member 14B rotatably supports a set of planet gears 14D configured to intermesh with both the sun gear member 14A and the ring gear member 14C. The sun gear member 14C is connected for common rotation with a first shaft or interconnecting member 52 and with input shaft or member 12. The planet carrier member 14B is connected for common rotation with a second shaft or interconnecting member 54 and with a third shaft or interconnecting member 56. The ring gear member 14C is connected for common rotation with a fourth shaft or interconnecting member 58.

The planetary gear set 16 includes a sun gear member 16C, a planet gear carrier member 16B and a ring gear member 16A. The planet gear carrier member 16B rotatably supports a set of planet gears 16D configured to intermesh with both the sun gear member 16C and the ring gear member 16A. The sun gear member 16C is connected for common rotation with a fifth shaft or interconnecting member 60. The planet carrier member 16B is connected for common rotation with fourth shaft or interconnecting member 58. The ring gear member 16A is connected for common rotation with a sixth shaft or interconnecting member 62.

The planetary gear set 18 includes a sun gear member 18A, a planet gear carrier member 18B and a ring gear member 18C. The planet gear carrier member 18B rotatably supports a set of planet gears 18D configured to intermesh with both the sun gear member 18A and the ring gear member 18C. The sun gear member 18A is connected for common rotation with the sixth shaft or interconnecting member 62. The planet carrier member 18B is connected for common rotation with a seventh shaft or interconnecting member 64 and an eighth shaft or interconnecting member 66. The ring gear member 18C is connected for common rotation with the output shaft or member 24.

The first external gear set 20 includes a first gear member 20A intermeshed with a second gear member 20C. The first gear member 20A is connected for common rotation with the third shaft or interconnecting member 56. The second gear member 20C is connected for common rotation with a ninth shaft or interconnecting member 68.

The second external gear set 22 includes a first gear member 22A intermeshed with a second gear member 22C. The first gear member 22A is connected for common rotation with the seventh shaft or interconnecting member 64. The second gear member 22C is connected for common rotation with a tenth shaft or interconnecting member 70.

In an alternative embodiment of the present invention, coplanar gear sets 20 and 22 are each replaced by sprockets rotationally coupled by a chain or belt (represented by the dashed boxes labeled 80 in FIG. 2). More specifically, in the instant embodiment each of the first gear members 20A and 22A are replaced by first sprockets and each of the second gear members 20C and 22C are replaced by second sprockets. Moreover, a torque transfer chain is provided for each gear or sprocket set 20 and 22. Each of the torque transfer chains mesh with each of the first and second sprockets of each of the gear sets to transfer torque between the sprockets.

The input shaft or member 12 is continuously connected to an engine (not shown) or to a turbine of a torque converter (not shown). The output shaft or member 24 is continuously connected with the final drive unit or transfer case (not shown).

The torque-transmitting elements or the clutches 26, 28, 30, 32 and first and second brakes 34 and 36 allow for selective interconnection of the shafts or interconnecting members, members of the planetary gear sets and external gear sets, and the transmission housing. For example, the first clutch 26 is selectively engageable to connect the second shaft or interconnecting member 54 with the sixth shaft or interconnecting member 62. The second clutch 28 is selectively engageable to connect the ninth shaft or interconnecting member 68 with the tenth shaft or interconnecting member 70. The third clutch 30 is selectively engageable to connect the first shaft or interconnecting member 52 with the eighth shaft or interconnecting member 66. The fourth clutch 32 is selectively engageable to connect the fifth shaft or interconnecting member 60 with the seventh shaft or interconnecting member 64. The first brake 34 is selectively engageable to connect the fourth interconnecting member 58 to a stationary element or the transmission housing 50 in order to restrict member 58 from rotating relative to the transmission housing 50. The second brake 36 is selectively engageable to connect the fifth shaft or interconnecting member 60 to a stationary element or the transmission housing 50 in order to restrict member 60 from rotating relative to the transmission housing 50.

In the particular example provided, the transmission 10 is arranged along two parallel and spaced apart axes including a first axis defined by the input member 12 and a second axis defined by the ninth shaft or interconnecting member 68. The ninth shaft or interconnecting member 68 is an idler shaft. Accordingly, in the example provided, the planetary gear set 14, 16 and 18, the first gear member 20A, the first gear member 22A and the clutches 26, 30, 32 and brakes 34 and 36 are all coaxial with the first axis (input shaft or member 12). The second gear member 20C, the second gear member 22C and the second clutch 28 are all coaxial with the second axis (ninth shaft or interconnecting member 68).

Referring now to FIG. 3, the operation of the embodiments of the ten speed transmission 10 will be described. It will be appreciated that the transmission 10 is capable of transmitting torque from the input shaft or member 12 to the output shaft or member 24 in at least ten forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30, fourth clutch 32, first brake 34 and second brake 36), as will be explained below. FIG. 3 is a truth table presenting the various combinations of torque-transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish reverse gear, the first clutch 26, the fourth clutch 32 and the second brake 36 are engaged or activated. The first clutch 26 connects the second shaft or interconnecting member 54 with the sixth shaft or interconnecting member 62. The fourth clutch 32 connects the fifth shaft or interconnecting member 60 with the seventh shaft or interconnecting member 64. The second brake 36 connects the fifth shaft or interconnecting member 60 to a stationary element or the transmission housing 50 in order to restrict member 60 from rotating relative to the transmission housing 50. Likewise, the ten forward ratios are achieved through different combinations of clutch and brake engagements, as shown in FIG. 3.

It will be appreciated that the foregoing explanation of operation and gear states of the ten speed transmission 10 assumes, first of all, that all the clutches and the brake not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
   an input member;
   an output member;
   a first, second and third planetary gear sets each having a first, second and third member;
   a first and second torque transfer assembly each having a first member and a second member;
   a first interconnecting member continuously interconnecting the first member of the first torque transfer assembly directly to the second member of the first planetary gear set;
   a second interconnecting member continuously interconnecting the third member of the first planetary gear set directly to the second member of the second planetary gear set;
   a third interconnecting member continuously interconnecting the first member of the second planetary gear set directly to the first member of the third planetary gear set;
   a fourth interconnecting member continuously interconnecting the second member of the third planetary gear set directly to the first member of the second torque transfer assembly; and
   six torque transmitting mechanisms each selectively engageable to interconnect at least one of the first members, second members, third members of the first, second and third planetary gear sets, first members and second members of the first and second torque transfer assemblies with at least one other of the first members, second members, third members of the first, second and third planetary gear sets, the first members and the second members of the first and second torque transfer assemblies and a stationary member, and wherein the six torque transmitting mechanisms are each selectively engageable in combinations of at least three to establish at least ten forward speed ratios and at least one reverse speed ratio between the input member and the output member.

2. The transmission of claim 1 wherein a first of the six torque transmitting mechanisms is selectively engageable to interconnect the second member of the first planetary gear set with at least one of the first member of the second planetary gear set and first member of the third planetary gear set.

3. The transmission of claim 2 wherein a second of the six torque transmitting mechanisms is selectively engageable to interconnect the second member of the first torque transfer assembly with the second member of the second torque transfer assembly.

4. The transmission of claim 3 wherein a third of the six torque transmitting mechanisms is selectively engageable to interconnect the first member of the first planetary gear set and the input member with at least one of the first member of the second torque transfer assembly and the second member of the third planetary gear set.

5. The transmission of claim 4 wherein a fourth of the six torque transmitting mechanisms is selectively engageable to interconnect at least one of the first member of the second torque transfer assembly and the second member of the third planetary gear set with the third member of the second planetary gear set.

6. The transmission of claim 5 wherein a fifth of the six torque transmitting mechanisms is selectively engageable to interconnect the third member of the first planetary gear set and the second member of the second planetary gear set with the stationary member.

7. The transmission of claim 6 wherein a sixth of the six torque transmitting mechanisms is selectively engageable to interconnect the third member of the second planetary gear set with the stationary member.

8. The transmission of claim 1 wherein the input member is continuously interconnected with the first member of the first planetary gear set and wherein the output member is continuously interconnected with the third member of the third planetary gear set.

9. The transmission of claim 1 wherein the first member of the first planetary gear set and the first member of the third planetary gear set, the third members of the second planetary gear sets are sun gears, the second members of the first, second and third planetary gear sets are carrier members and the third members of the first and third planetary gear sets and the first member of the second planetary gear set are ring gears.

10. The transmission of claim 1 wherein the stationary member is a transmission housing.

11. The transmission of claim 1 wherein the first and the second members of the first and the second torque transfer assemblies each include a first and a second sprocket.

12. The transmission of claim 11 wherein the first and the second torque transfer assemblies each further comprise a third member, wherein the third member is a chain for coupling the first and the second sprocket to transfer torque there between.

13. A transmission comprising:
an input member;
an output member;
a first, second and third planetary gear sets each having a first, second, and third member, wherein the input member is continuously interconnected with the first member of the first planetary gear set and wherein the output member is continuously interconnected with the third member of the third planetary gear set;
a first and a second co-planar gear set each having a first member and a second member;
a first interconnecting member continuously interconnecting the first member of the first co-planar gear set with the second member of the first planetary gear set;
a second interconnecting member continuously interconnecting the third member of the first planetary gear set with the second member of the second planetary gear set;
a third interconnecting member continuously interconnecting the first member of the second planetary gear set with the first member of the third planetary gear set;
a fourth interconnecting member continuously interconnecting the second member of the third planetary gear set with the first member of the second co-planar gear set;
a first torque transmitting mechanism selectively engageable to interconnect the second member of the first planetary gear set with at least one of the first member of the second planetary gear set and first member of the third planetary gear set;
a second torque transmitting mechanism selectively engageable to interconnect the second member of the first co-planar gear set with the second member of the second co-planar gear set;
a third torque transmitting mechanism selectively engageable to interconnect the first member of the first planetary gear set and the input member with at least one of the first member of the second co-planar gear set and the second member of the third planetary gear set;
a fourth torque transmitting mechanism selectively engageable to interconnect at least one of the first member of the second co-planar gear set and the second member of the third planetary gear set with the third member of the second planetary gear set;
a fifth torque transmitting mechanism selectively engageable to interconnect the third member of the first planetary gear set and the second member of the second planetary gear set with the stationary member;
a sixth torque transmitting mechanism selectively engageable to interconnect the third member of the second planetary gear set with the stationary member, and
wherein the torque transmitting mechanisms are each selectively engageable in combinations of at least three to establish at least ten forward speed ratios and at least one reverse speed ratio between the input member and the output member.

14. The transmission of claim 13 wherein the first member of the first planetary gear set and the first member of the third planetary gear set, the third members of the second planetary gear sets are sun gears, the second members of the first, second and third planetary gear sets are carrier members and the third members of the first and third planetary gear sets and the first member of the second planetary gear set are ring gears.

15. The transmission of claim 13 wherein the stationary member is a transmission housing.

16. The transmission of claim 13 wherein the first and the second members of the first and the second co-planar gear sets are a first and a second intermeshing gears.

17. The transmission of claim 13 wherein the first and the second members of the first and the second co-planar gear sets are a first and a second sprockets.

18. The transmission of claim 17 wherein the first and the second co-planar gear sets each further comprise a third member, wherein the third member is a chain for coupling the first and second sprockets to transfer torque there between.

19. A transmission comprising:
an input member;

an output member;

a first, second and third planetary gear sets each having a sun gear, carrier member, and ring gear, wherein the input member is continuously interconnected with the sun gear of the first planetary gear set and wherein the output member is continuously interconnected with the ring gear of the third planetary gear set;

a first and second co-planar gear set each having a first gear and a second gear;

a first interconnecting member continuously interconnecting the first gear of the first co-planar gear set with the carrier member of the first planetary gear set;

a second interconnecting member continuously interconnecting the ring gear of the first planetary gear set with the carrier member of the second planetary gear set;

a third interconnecting member continuously interconnecting the ring gear member of the second planetary gear set with the sun gear of the third planetary gear set;

a fourth interconnecting member continuously interconnecting the carrier member of the third planetary gear set with the first gear of the second co-planar gear set;

a first torque transmitting mechanism selectively engageable to interconnect the carrier member of the first planetary gear set with at least one of the ring gear of the second planetary gear set and sun gear of the third planetary gear set;

a second torque transmitting mechanism selectively engageable to interconnect the second gear of the first co-planar gear set with the second gear of the second co-planar gear set;

a third torque transmitting mechanism selectively engageable to interconnect the sun gear of the first planetary gear set and the input member with at least one of the first gear of the second co-planar gear set and the second carrier of the third planetary gear set;

a fourth torque transmitting mechanism selectively engageable to interconnect at least one of the first gear of the second co-planar gear set and the carrier member of the third planetary gear set with the sun gear member of the second planetary gear set;

a fifth torque transmitting mechanism selectively engageable to interconnect the ring gear of the first planetary gear set and the carrier member of the second planetary gear set with the stationary member;

a sixth torque transmitting mechanism selectively engageable to interconnect the sun gear member of the second planetary gear set with the stationary member, and wherein the torque transmitting mechanisms are each selectively engageable in combinations of at least three to establish at least ten forward speed ratios and at least one reverse speed ratio between the input member and the output member.

20. The transmission of claim 19 wherein the stationary member is a transmission housing.

* * * * *